United States Patent [19]
Liechti et al.

[11] Patent Number: 5,366,703
[45] Date of Patent: Nov. 22, 1994

[54] METHODS AND SYSTEMS FOR FORMING PROCESS GASES HAVING HIGH EFFECTIVE OZONE CONTENT UTILIZING ISOTHERMAL COMPRESSION

[75] Inventors: Pierre A. Liechti, Regensdorf; Franco Gaia, Zurich, both of Switzerland; Marc Andre, Paris, France

[73] Assignee: Ozonia International S.A., Rueil-Malmaison, France

[21] Appl. No.: 833,487

[22] Filed: Feb. 10, 1992

[51] Int. Cl.[5] .......................... B01J 19/12; C01B 13/11
[52] U.S. Cl. .................. 422/186.11; 422/186.07; 204/176
[58] Field of Search ............... 422/186.07, 186.11; 204/176

[56] References Cited

PUBLICATIONS

Dimitriou, "Design Guidance Manual for Ozone Systems", International Ozone Ass'n Pan American Committee, pp. 16, 17, 18, 35, 45, 57, 58, 59; 1990.

McCabe et al., "Unit Operations of Chemical Engineering," 3rd ed., McGraw-Hill, pp. 194–197; 1976.

Primary Examiner—Donald P. Walsh
Assistant Examiner—Daniel Jenkins
Attorney, Agent, or Firm—Carroll F. Palmer

[57] ABSTRACT

A method for the generation of a supply of ozone containing process gas exhibiting high effective ozone content basically involves the steps of (a) providing a stream of an oxygen containing feed gas having a temperature not greater than about 50° C. and an absolute pressure between about 1 and 3 bar, (b) subjecting the stream of feed gas to an electric discharge that transforms some of its oxygen content into ozone to produce a stream of ozone containing gas, and (c) compressing the ozone containing gas with simultaneous cooling thereof to produce a stream of ozone containing process gas having a temperature not greater than about the temperature of the feed gas, an absolute pressure greater than 3 bar and an absolute ozone partial pressure of at least 0.2 bar. Various systems for carrying out such methods are disclosed.

19 Claims, 4 Drawing Sheets

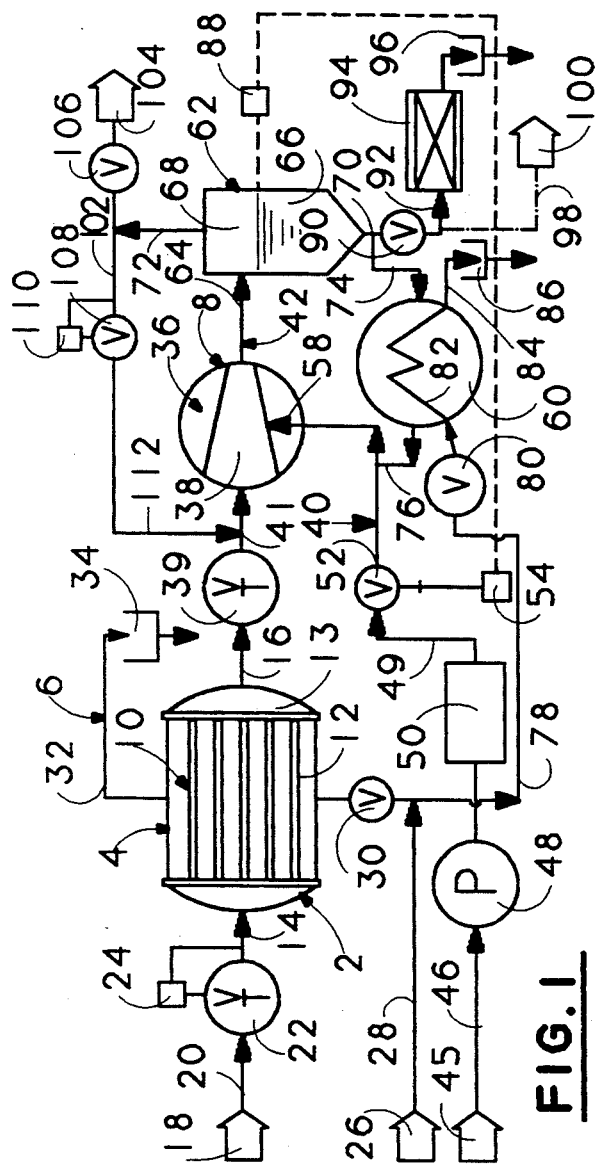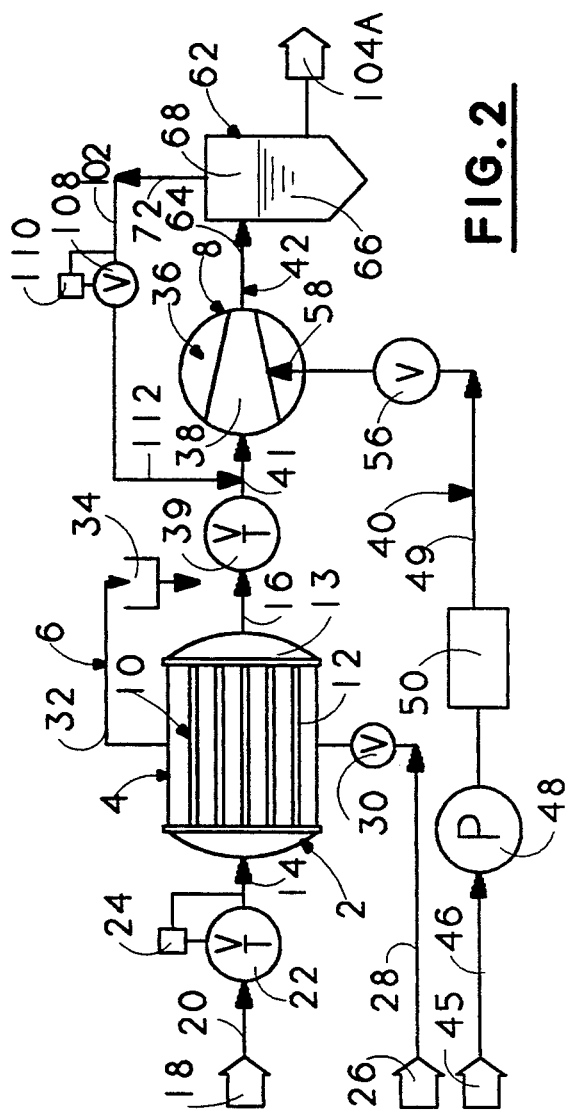

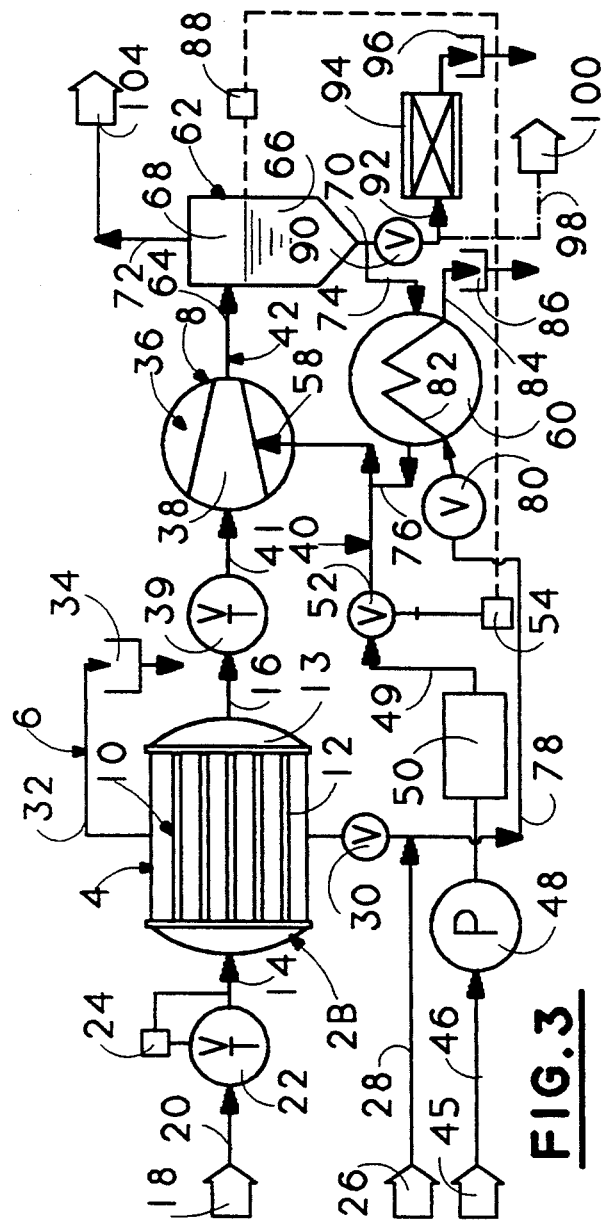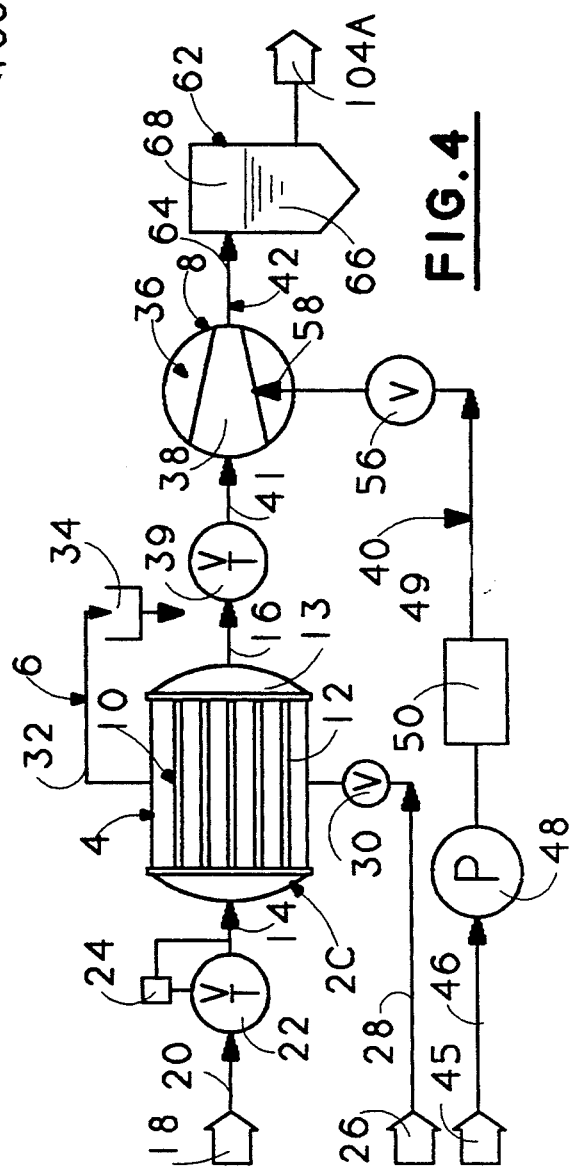

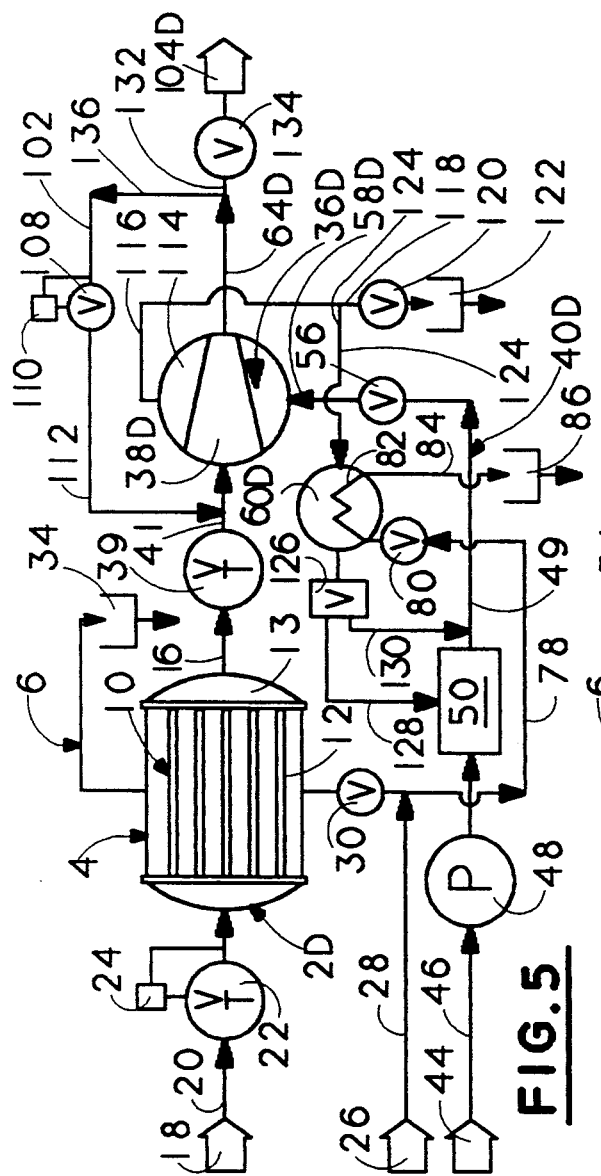

METHODS AND SYSTEMS FOR FORMING PROCESS GASES HAVING HIGH EFFECTIVE OZONE CONTENT UTILIZING ISOTHERMAL COMPRESSION

BACKGROUND OF THE INVENTION

1. Field of the Invention

This application relates to new methods and systems for forming process gases having high effective ozone content. More particularly, it concerns new methods for the production of gases containing absolute partial pressures of ozone of at least 0.2 bar and systems for performing such methods.

2. Description of the Prior Art

Ozone ($O_3$) is the triatomic form of oxygen and an allotrope of oxygen. Ozone is a very strong oxidant and like some other oxidants, for example, hydrogen peroxide, is not very stable and self-decomposes back into diatmoic oxygen.

Temperature affects dramatically the self-decomposition of ozone. For example, at temperatures of 100 to 200° C., the rate of self-decomposition is very fast, in the range of seconds, while at temperatures below 50° C., the half life time is long (minutes). At 350° C., the self-decomposition of ozone is instantaneous so industrial, strictly thermal, waste ozone destructors operate at or above this temperature. Pressures higher than ambient pressure also accelerate the self-decomposition of ozone.

Large quantities of ozone are industrially produced in so called ozone generators, where an oxygen containing feed gas is subjected to electrical discharge, which transforms some of the contained oxygen into ozone. Normal feed gases to ozone generators are dried air, high purity oxygen, and mixtures of oxygen with nitrogen, carbon dioxide, argon, and other minor components.

Ozone concentrations that can economically be achieved with standard ozone generators range from 1 to 2% by weight in air and 2 to 4% by weight in high purity oxygen. So called, high concentration ozone generators produce ozone at concentrations of 6% by weight or higher. High concentration ozone generators must operate at higher power densities to achieve ozone concentrations of 6 or more % by weight than standard ozone generators. However, higher power densities result in higher ozone gas discharge temperatures and, therefore, high concentration ozone gas leaves the ozone generator at temperatures close to or above 50° C. and ozone self-decomposition may take place.

Ozone generators must be cooled with a fluid coolant in order to eliminate the excess electrical power supplied to the ozone generator and which has not been transformed into chemical energy, ozone and other chemical species. Such coolant is generally water, chilled or not, but other liquids or gases may be used as coolants. The temperature and the flow of the coolant affect dramatically the ozone concentration which can be achieved and the temperature of the ozone gas leaving the ozone generator. Typical coolant temperatures range from 4° C. for chilled water up to 30° C. or higher. Heat created in operation of ozone generators has been removed using coolants in a variety of ways, e.g., see U.S. Pat. Nos. 1,994,462; 2,345,798; 2,404,773 and 2,704,274.

Ozone gas is economically produced at pressures ranging between about 1 and 3 bar absolute. Higher pressures may be non-economical and may result in undesired ozone self-decomposition, but ozone generators operating at higher pressures have been disclosed, see U.S Pat. Nos. 2,936,279; 4,614,573 and 4,988,484.

Some industrial applications of ozone, for example, medium consistency pulp bleaching, require ozone to be supplied at absolute ozone partial pressures ranging from 0.2 bar up to 0.7 bar or even higher up to more than 1.0 bar. In an industrial high concentration ozone generator, e.g., see U.S. Pat. No. 4,650,648, ozone can, for example, be produced at 7%–12% by weight and 2 bar absolute with a corresponding absolute ozone partial pressure of approximately 0.09 bar. For this reason, it is necessary in this bleaching application and in others to increase the ozone gas pressure after the ozone generator from 2 bar absolute to pressures ranging from about 4 up to about 15 bar absolute.

The compression of gases containing ozone and oxygen to provide a process gas to be subsequently used for some purpose has long been known, see U.S. Pat. No. 430,387. The present invention uses compression of such gases in a unique manner efficiently and economically to produce process gases containing ozone at relatively high absolute partial pressures.

OBJECTS

A principal object of the invention is the provision of new methods for the efficient and economical production of ozone containing process gases having high effective ozone content.

Further objects include the provision of:

1. New methods for production of ozone containing process gases having high ozone absolute partial pressures.
2. New systems for performing such new methods.
3. Ozone containing process gases having specific ranges of ozone gas pressure, absolute ozone partial pressures and ozone concentrations.
4. Systems for the generation and supply of process gases having a relatively high absolute partial pressure of ozone in such a way that the temperature of the ozone gas so provided is not appreciably higher and/or is even advantageously lower than the temperature of the gas fed to the system for partial conversion into ozone.

Other objects and further scope of applicability of the present invention will become apparent from the detailed descriptions given herein; it should be understood, however, that the detailed descriptions, while indicating preferred embodiments of the invention, are given by way of illustration only, since various changes and modifications within the spirit and scope of the invention will become apparent from such descriptions.

SUMMARY OF THE INVENTION

The objects are accomplished in part in accordance with the invention by the provision of a method for the generation of a supply of ozone containing process gas exhibiting high effective ozone content which comprises (a) providing a stream of an oxygen containing feed gas having a temperature not greater than about 50° C. and an absolute pressure between about 1 and 3 bar, (b) subjecting the stream of feed gas to an electric discharge that transforms some of its oxygen content into ozone to produce a stream of ozone containing gas, and (c) compressing the ozone containing gas with simultaneous cooling thereof to produce a stream of ozone containing process gas having a temperature not greater than about the temperature of the feed gas, an absolute pressure greater than 3 bar and an absolute ozone partial pressure of at least 0.2 bar.

Preferably, the feed gas contains at least 70% by weight of oxygen and its temperature is between about 0° and 50° C. Also, the feed gas is preferably dried air, high purity oxygen, or mixtures of oxygen with nitrogen, carbon dioxide or argon.

Advantageously, the process gas has an absolute ozone partial pressure of at least 0.2 bar, an ozone concentration of at least 4% by weight and an ozone absolute gas pressure of at least 3 bar.

In one embodiment of the new methods, the process gas has an absolute ozone partial pressure of between about 0.2 and 1.2 bar, an ozone concentration of between about 4 and 12% by weight and an ozone absolute gas pressure of between about 3 and 15 bar.

In a second embodiment, the process gas has an absolute ozone partial pressure of between about 0.2 and 0.7 bar, an ozone concentration of between about 4 and 7% by weight and an ozone absolute gas pressure of between about 5 and 15 bar.

In a third embodiment, the process gas has an absolute ozone partial pressure of between about 0.7 and 1.2 bar, an ozone concentration of between about 7 and 12% by weight and an ozone absolute gas pressure of between about 7 and 15 bar.

In preferred methods, the stream of ozone containing gas is passed into a compression zone wherein it is compressed by reduction of its volume with simultaneous cooling within the compression zone to produce a stream of ozone containing process gas having a temperature not greater than about the temperature of the feed gas, an absolute pressure greater than 3 bar and an absolute ozone partial pressure of at least 0.2 bar.

Cooling of the ozone containing gas within the compression zone advantageously is preformed by direct contact of liquid coolant with the ozone containing gas, the liquid coolant is discharged simultaneously with the process gas from the compression zone and then the liquid coolant is separated from the process gas and recycled to the compression zone. Alternatively, the liquid coolant is discharged from the compression zone simultaneously with the discharging process gas and the liquid coolant plus the process gas are together passed to and utilized in a further chemical operation.

In another embodiment, the cooling of the ozone containing gas within the compression zone is preformed by indirect heat exchange between a fluid coolant and the ozone containing gas.

The objects are further accomplished in accordance with the invention by the provision of a system for the generation of a supply of ozone containing process gas exhibiting high effective ozone content from a stream of oxygen containing feed gas which comprises (1) ozone generation means to receive the stream of feed gas, convert a portion of the oxygen contained therein into ozone by electric discharge and produce an exiting stream of ozone containing gas, (2) cooling means to remove heat from the ozone generation means, (3) compressor means to increase the absolute pressure of the ozone containing gas comprising at least one chamber through which the ozone containing gas passes with simultaneous reduction in volume to form compressed ozone containing process gas, (4) fluid coolant means to remove heat from the chamber, and (5) discharge means through which to remove the process gas from the compressor means.

In a preferred embodiment of the new systems, the ozone generation means comprises tubular means defined by tubular walls through which the feed gas internally passes during operation of the system and the cooling means comprises jacket means to externally contact the tubular walls with heat exchange fluid.

Also preferably, the compressor means has a plurality of chambers defined by vanes extending laterally from a shaft that rotates asymmetrically within a lobe and the liquid coolant means includes tubular means to pass liquid coolant into the lobe. Further, such compressor means includes an inlet into the lobe for a stream of ozone containing gas and a outlet from the lobe tbr simultaneous discharge of the compressed process gas and liquid coolant.

Advantageously, the discharge means includes separator means having an inlet to receive the simultaneous discharged process gas and liquid coolant and separate them into a liquid component and a gas component, a first outlet for the liquid component and a second outlet for the gas component. Further, it includes a heat exchanger, first piping connecting the first outlet to the heat exchanger and second piping connecting the heat exchanger to the inlet into the lobe whereby the liquid component can be recycled from the separator means through the heat exchanger to the compressor means.

BRIEF DESCRIPTION OF THE DRAWINGS

A more complete understanding of the invention can be obtained by reference to the accompanying drawings in which:

FIG. 1 is a diagrammatic illustration of a first embodiment of a system for the generation of a supply of ozone containing process gas exhibiting high effective ozone content from a stream of oxygen containing feed gas in accordance with the invention.

FIG. 2 is a diagrammatic illustration of a second embodiment of a process gas generation system in accordance with the invention.

FIG. 3 is a diagrammatic illustration of a third embodiment of a process gas generation system in accordance with the invention.

FIG. 4 is a diagrammatic illustration of a fourth embodiment of a process gas generation system in accordance with the invention.

FIG. 5 is a diagrammatic illustration of a fifth embodiment of a process gas generation system in accordance with the invention.

FIG. 6 is a diagrammatic illustration of a sixth embodiment of a process gas generation system in accordance with the invention.

DESCRIPTION OF THE PREFERRED EMBODIMENTS

Figure 7:
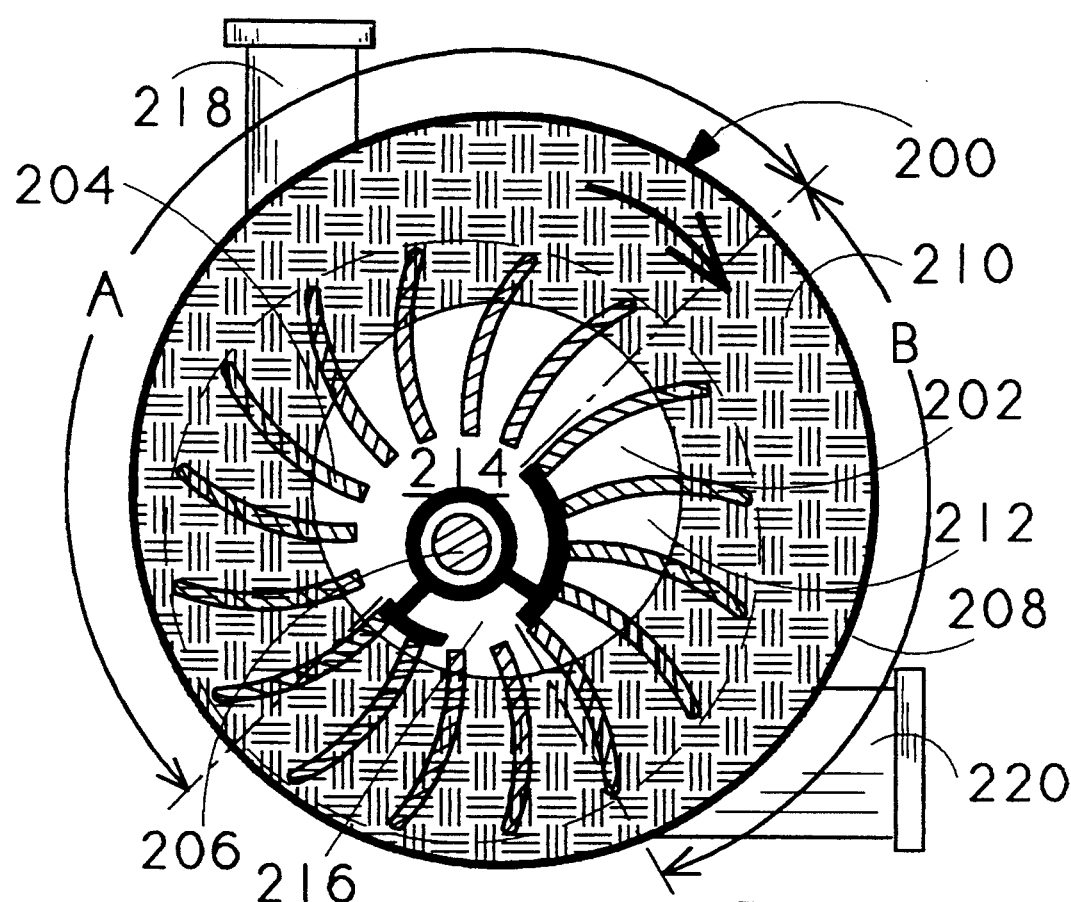
FIG. 7 is a lateral sectional view of a preferred form of compressor for use in carrying out the new methods of the invention and as a component in the new process gas generation systems of the invention.

Referring in detail to the drawings, the system 2 for the generation of a supply of ozone containing process gas from a stream of oxygen containing feed gas comprises ozone generation means 4 to receive the stream of feed gas, convert a portion of the oxygen contained therein into ozone by electric discharge and produce an exiting stream of ozone containing gas, cooling means 6 to remove heat from the ozone generation means and compressor means 8 to increase the absolute pressure of the ozone containing gas.

The ozone generation means 4 as shown, comprises tubular means 10, defined by tubular walls 12 through which the feed gas internally passes during operation of the system 2 and jacket means 13. The tubular means 10 includes feed gas inlet 14 and ozone containing gas outlet 16.

The feed gas source 18 is connected to gas inlet 14 via piping 20 and throttle valve 22 equipped with controller 24.

The generation means 4 further typically includes electric discharge means (not shown) including electrodes, wiring and related electrical units.

The cooling means 6 includes fluid coolant source 26, inlet piping 28, valve 30, outlet piping 32 and the coolant discharge unit 34.

Compression means 8 comprises compressor 36 having at least one chamber 38 to which the ozone containing gas passes from generator means 4 via valve 39 and line 41 to form compressed ozone containing process gas, fluid coolant means 40 to remove heat from the chamber 38, and discharge means 42 through which to discharge the process gas from the compressor means 8.

Coolant means 40 includes fluid source 45, line 46, pump 48, fluid conditioner unit 50, line 49, valve 52 with controller 54 and inlet 58 to chamber 38 and heat exchanger 60.

Discharge means 42 includes separator means 62 having an inlet 64 to receive the simultaneous discharged process gas and liquid coolant and separate them into a liquid component 66 and a gas component 68, a first outlet 70 for the liquid component and a second outlet 72 for the gas component. First piping 74 connects the first outlet 70 to the heat exchanger 60 and second piping 76 connects the heat exchanger 60 to the inlet line 58 to chamber 38 whereby the liquid component 66 can be recycled from the separator means 62 through the heat exchanger 60 to the compressor means 8.

Piping 78 and valve 80 connect the internal elements 82 of heat exchanger 60 to the coolant source 26 and outlet piping 84 discharges coolant from elements 82 into the liquid discharge unit 86.

Liquid level detector 88 functions with valve controller 54 to regulate the ratio of coolant liquid entering chamber 38 via inlet 58 from source 26 versus from separator means 62.

A portion of the liquid component 66 exits the separator means 62 via valve 90, line 92, discharge liquid treatment unit 94 for removal via liquid discharge 96. Alternatively, such liquid portion can pass without treatment via line 98 to waste 100, e.g., retaining basin, etc.

The outlet 72 from separator means 62 joins line 102 to pass gas component 68 both to process gas supply 104 via valve 106 and chamber 38 via valve 108, regulated by controller 110, and line 112.

System 2A of FIG. 2 is of simpler construction than system 2 since it does not comprise a heat exchanger 60 and its related plumbing, etc. Also, system 2A provides a product supply 104A which, in contrast to supply 104 of system 2, is a mixture of ozone containing process gas and coolant liquid.

System 2B of FIG. 3 is similar to system 2, but does not include line 112 and value 108 so there is no recycle of a portion of the gas component 68 to the compressor 36. Thus, system 2B is a "once through" system for feed gas from source 18.

System 2C of FIG. 4 is similar to system 2A, but like system 2B does not provide for gas recycle to the compressor 36.

System 2D of FIG. 5 differs from systems 2, 2A, 2B and 2C in that during compression of the ozone containing gas streaming from generator means 10, gas present in the compressor 36D is cooled by indirect heat exchange with a fluid coolant rather than by direct contact with the coolant as in systems 2–2C. Thus, the compressor 36D has a jacket 114 with fluid inlet 58D and outlet 116 which splits into a discharge line 118 with valve 120 that leads to discharge unit 122 and a recycle line 124 that leads to heat exchanger 60D of the cooling means 40D.

The cooling means 40D differs from cooling means 40 of systems 2 etc. since external portion of exchanger 60D exits through line 76D to distributing valve which divides fluid flow into lines 128 and 130. Also, system 2D differs from systems 2 etc. since it has no separator means like 62. Thus, line 64D, instead of leading to a separator, divides with one leg 130 with valve 134 that discharges process gas stream 104D and another leg 136 that connects to line 102.

The system 2E is like system 2D, but has no gas recycle to the compressor 36D so that all fluid exiting from compressor 36D via line 64D discharges as process gas stream 104E.

Figure 8:
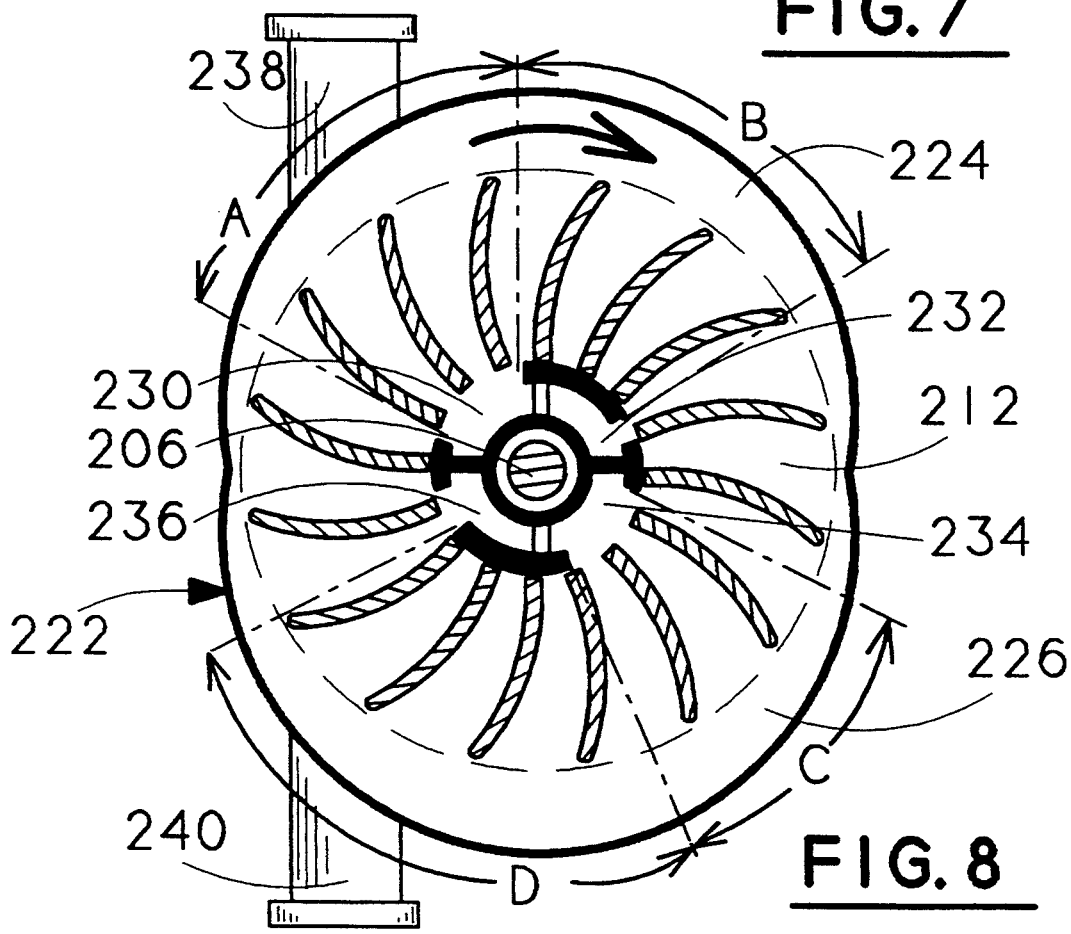
FIG. 8 is a lateral sectional view of another preferred form of compressor for use with the invention.

A wide variety of gas compressors that are capable of removing heat from the gas being compressed are commercially available for use in this invention. Many of these cool the gas by indirect heat exchange between the gas and the coolant that does not contact the gas within the compression chamber. Alternatively, usable compressors are available that cool the gas being compressed by direct contact of the gas with the coolant within the compression chamber and such compressors are preferred. FIGS. 7 & 8 illustrate two embodiments of this type of compressor known as liquid ring compressors.

In FIG. 7 the compressor 200 has a plurality of the chambers 202 defined by vanes 204 extending laterally from shaft 206 that rotates asymmetrically within a circular lobe 208 and the cylindrical ring liquid coolant 210 that is kept rotating by the vanes 204 and tends to center itself in the lobe 208. As indicated, the liquid almost fills and then partially empties each compression chamber during a single revolution producing a piston action on the entrappeal gas 212. In sector "A", liquid moves outward and draws gas from inlet port 214, while in sector "B", liquid moves inward compressing the gas in the chambers 202 which then vents through discharge port 216.

The compressor 200 includes tubular means 218 to pass liquid coolant and ozone containing gas into the lobe 208 and tubular means 220 to discharge compressed process gas and liquid coolant from the lobe 208.

In FIG. 8, the compressor 222 comprises double lobes 224 and 226 wherein the vanes 204 rotate creating gas compressing chambers 212. The ring of liquid coolant (not shown) fills and partially empties each compression chamber twice during a single revolution of the shaft 206. Thus, in sector "A" of lobe 224, liquid moves outward and draws gas from inlet port 214, while in sector "B", liquid moves inward compressing the gas in the chambers 212 which then vent through discharge port 232. Also, in sector "C" of lobe 226, liquid moves outward and draws gas from inlet port 234, while in sector "D", liquid moves inward compressing the gas in the chambers 212 which then vent through discharge port 236.

The compressor 222 includes tubular means 238 to pass liquid coolant and ozone containing gas into the lobes 224 and 216 and tubular means 240 to discharge compressed process gas and liquid coolant from such lobes.

With reference to FIG. 1, the generation of a supply of process gas exhibiting high effective ozone content in accordance with the invention basically comprises feeding a stream of an oxygen containing feed gas having a temperature not greater than about 50° C. and an absolute pressure between about 1 and 3 bar from feed gas source 18 through the valve 22 into the ozone generator 4 where the stream of feed gas subjected to an electric discharge that transforms some of its oxygen content into ozone to produce a stream of ozone containing gas. During the ozone generation operation, liquid coolant from source 26 is used to remove some of the heat generated thereby and the heated coolant is passed to the coolant discharge 34.

The ozone containing gas is passed via valve 39 to compressor 36 wherein such gas is compressed in chamber 38 by reduction in volume with simultaneous cooling. Such cooling is effected by contacting the gas with liquid coolant passed into chamber 38 through chamber inlet 58 to produce a stream of ozone containing process gas having a temperature not greater than about the temperature of the feed gas entering the ozone generator 4, an absolute pressure greater than 3 bar and an absolute ozone partial pressure of at least 0.2 bar.

From the compressor 36, the resulting process gas passes to separator 62 to be divided into the process gas component 68 and liquid component 66. Valve 108 may be regulated to allow part or none of the process gas 68 to recycle via line 112 to the compressor and the remainder or all thereof passes via valve 106 as a stream of process gas 104 to a subsequent operation that requires process gas exhibiting high effective ozone content. Meanwhile, the liquid component 66 may be recycled, in whole or in part, via heat exchanger 60 to compressor 36 or may be, in whole or in part, discarded via liquid discharge 96.

Alternatively, with reference to FIG. 2, the process gas may be passes to a utilization operation (not shown) as a stream of mixed coolant liquid and process gas 104A.

FIGS. 3 and 4 illustrate methods of the invention in which no provision is made for recycle of a portion of gas from separation 62 to recycle to the compressor 36, i.e., so-called "once through" operation.

FIGS. 5 and 6 illustrate methods of the invention in which ozone containing gas being compressed in compressors 36D is cooled during compression by indirect heat exchange with fluid coolant passing through jackets 114.

I claim:

1. A method for the generation of a supply of ozone containing process gas exhibiting high effective ozone content which comprises:

providing a stream of an oxygen containing feed gas having a temperature not greater than about 50° C. and an absolute pressure between about 1 and 3 bar, subjecting said stream of feed gas to an electric discharge that transforms some of its oxygen content into ozone to produce a stream of ozone containing gas, and isothermally compressing said ozone containing gas to produce a stream of ozone containing process gas having a temperature not greater than about said temperature of said feed gas, an absolute pressure greater than 3 bar and an absolute ozone partial pressure of at least 0.2 bar.

2. The method of claim I wherein said process gas has an absolute ozone partial pressure of at least 0.2 bar, an ozone concentration of at least 4% by weight and an ozone absolute gas pressure of at least 3 bar.

3. The method of claim 2 wherein said process gas has an absolute ozone partial pressure of between about 0.2 and 1.2 bar, an ozone concentration of between about 4 and 12% by weight and an ozone absolute gas pressure of between about 3 and 15 bar.

4. The method of claim 3 wherein said process gas has an absolute ozone partial pressure of between about 0.2 and 0.7 bar, an ozone concentration of between about 4 and 7% by weight and an ozone absolute gas pressure of between about 5 and 15 bar.

5. The method of claim 3 wherein said process gas has an absolute ozone partial pressure of between about 0.7 and 1.2 bar, an ozone concentration of between about 7 and 12% by weight and an ozone absolute gas pressure of between about 7 and 15 bar.

6. The method of claim 1 wherein said temperature of said feed gas is between about 0° and 50° C.

7. The method of claim I wherein said feed gas is selected from the group consisting of dried air, high purity oxygen, and mixtures of oxygen with nitrogen, carbon dioxide or argon.

8. The method of claim 1 wherein said isothermal compression of said ozone containing gas comprises the simultaneous cooling of said ozone containing gas by direct contact during said compression with liquid coolant.

9. A method for the generation of a supply of ozone containing process gas exhibiting high effective ozone content which comprises:

providing a stream of feed gas containing at least 70% by weight of oxygen having a temperature between about 0° and 50° C. and an absolute pressure between about 1 and 3 bar, passing said feed gas stream through a confined zone, subjecting said feed gas stream within said confined zone to an electric discharge that transforms some of its oxygen content into ozone to produce a stream of ozone containing gas, cooling gas passing through said confined zone so it does not exceed 50° C., passing said stream of ozone containing gas into a compression zone, isothermally compressing said ozone containing gas within said compression zone, to produce a stream of ozone containing process gas having a temperature not greater than about said temperature of said feed gas, an absolute pressure greater than 3 bar and an absolute ozone partial pressure of at least 0.2 bar, and discharging said process gas from said compression zone.

10. The method of claim 9 wherein said cooling of said ozone containing gas within said compression zone is preformed by direct contact of liquid coolant with said ozone containing gas.

11. The method of claim 10 wherein said liquid coolant is discharged from said compression zone simultaneously with said discharging process gas, then said liquid coolant is separated from said process gas and recycled to said compression zone.

12. The method of claim 10 wherein said liquid coolant is discharged from said compression zone simultaneously with said discharging process gas and said liquid coolant and said process gas are together passed to and utilized in a further chemical operation.

13. The method of claim 9 wherein said cooling of said ozone containing gas within said compression zone is preformed by indirect heat exchange between a fluid coolant and said ozone containing gas.

14. A system for the generation of a supply of ozone containing process gas exhibiting high effective ozone content from a stream of oxygen containing feed gas which comprises:
   ozone generation means to receive said stream of feed gas, convert a portion of said oxygen contained therein into ozone by electric discharge and produce an exiting stream of ozone containing gas,
   cooling means to remove heat from said ozone generation means,
   isothermal compressor means to increase the absolute pressure of said ozone containing gas comprising at least one chamber through which said ozone containing gas passes with simultaneous reduction in volume to form compressed ozone containing process gas,
   liquid coolant within said chamber in direct contact with said ozone containing gas, and
   conduit means through which to discharge said process gas from said compressor means.

15. The system of claim 14 wherein said ozone generation means comprises tubular means defined by tubular walls through which said feed gas internally passes during operation of said system and said cooling means comprises jacket means to externally contact said tubular walls with heat exchange fluid.

16. The system of claim 13 wherein said compressor means has a plurality of said chambers defined by vanes extending laterally from a shaft that rotates asymmetrically within a lobe and said lobe contains said liquid coolant.

17. The system of claim 16 wherein said compressor means further includes an inlet into said lobe for said stream of ozone containing gas and a outlet from said lobe for simultaneous discharge of said compressed process gas and liquid coolant.

18. The system of claim 17 which includes separator means having:
   an inlet to receive said simultaneous discharged process gas and liquid coolant and separate them into a liquid component and a gas component,
   a first outlet for said liquid component and
   a second outlet for said gas component.

19. The system of claim 18 that further includes a heat exchanger, first piping connecting said first outlet to said heat exchanger and second piping connecting said heat exchanger to said inlet into said lobe whereby said liquid component can be recycled from said separator means through said heat exchanger to said compressor means.

* * * * *